US008508723B2

(12) United States Patent
Chang et al.

(10) Patent No.: US 8,508,723 B2
(45) Date of Patent: Aug. 13, 2013

(54) LASER WIND VELOCIMETER WITH MULTIPLE RADIATION SOURCES

(75) Inventors: Chia-Chen Chang, Gaithersburg, MD (US); Priyavadan Mamidipudi, Bristow, VA (US); Lance LeClair, Manassas, VA (US); Peter Gatchell, Nokesville, VA (US); Daniel Dakin, Great Falls, VA (US); Elizabeth A. Dakin, Great Falls, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 0 days.

(21) Appl. No.: 13/026,932

(22) Filed: Feb. 14, 2011

(65) Prior Publication Data

US 2012/0206712 A1 Aug. 16, 2012

(51) Int. Cl.
*G01P 3/36* (2006.01)
(52) U.S. Cl.
USPC .............................. 356/28; 356/28.5
(58) Field of Classification Search
USPC ...................... 356/28–28.5, 334; 342/357.78
See application file for complete search history.

(56) References Cited

U.S. PATENT DOCUMENTS

| | | |
|---|---|---|
| 3,856,402 A | 12/1974 | Low et al. |
| 4,451,916 A | 5/1984 | Casper et al. |
| 4,718,121 A | 1/1988 | Epworth |
| 4,728,168 A | 3/1988 | Alferness |
| 4,875,770 A | 10/1989 | Rogers et al. |
| 4,932,775 A | 6/1990 | Wissman et al. |
| 5,013,928 A | 5/1991 | Ikeda et al. |
| 5,272,513 A | 12/1993 | Vahala et al. |
| 5,307,197 A | 4/1994 | Tanabe et al. |
| 5,400,350 A | 3/1995 | Galvanauskas |
| 5,526,109 A | 6/1996 | Johnson |
| 5,610,705 A | 3/1997 | Brosnan et al. |
| 5,847,817 A | 12/1998 | Zediker et al. |
| 5,864,644 A | 1/1999 | DiGiovanni et al. |
| 6,580,497 B1 | 6/2003 | Asaka et al. |
| 7,428,253 B2 | 9/2008 | Murison et al. |

(Continued)

FOREIGN PATENT DOCUMENTS

| | | |
|---|---|---|
| CA | 2 064 488 C | 11/1992 |
| WO | WO 2009/134221 A1 | 11/2009 |

OTHER PUBLICATIONS

Czarske, J.W., "Laser Doppler velocimetry using powerful solid-state light sources," Measurement Science and Technology, vol. 17, No. 7, ISSN: 0957-0233, Jul. 1, 2006, pp. R71-R91.

(Continued)

*Primary Examiner* — Luke Ratcliffe
(74) *Attorney, Agent, or Firm* — Sterne, Kessler, Goldstein & Fox P.L.L.C.

(57) ABSTRACT

A system and method for measuring wind velocities are provided. A laser wind velocimeter with a radiation source includes a fiber laser. All optical signals, transmitted and received, are conveyed by optical fibers. An amplifier amplifies a source laser, which is then transmitted to one or more transceivers. The one or more transceivers, each projecting along a different axis, and each with a single optical fiber input/output interface act as both the transmission device to focus the radiation at a target region, and as the receiving system for collecting reflected radiation. The one or more transceivers transmit radiation to the target region. A portion of the reflected radiation collected by the receiving system is analyzed to determine the Doppler shift, which can me used to measure wind velocity.

26 Claims, 11 Drawing Sheets

(56) References Cited

U.S. PATENT DOCUMENTS

| | | | |
|---|---|---|---|
| 7,869,811 | B2 | 1/2011 | Wirola et al. |
| 2002/0149839 | A1 | 10/2002 | Hamoir |
| 2003/0225514 | A1 | 12/2003 | Lokshin et al. |
| 2006/0140764 | A1 | 6/2006 | Smith et al. |
| 2006/0227316 | A1 | 10/2006 | Gatt |
| 2007/0064219 | A1 | 3/2007 | Rogers et al. |
| 2008/0004904 | A1 | 1/2008 | Tran |
| 2010/0134781 | A1 | 6/2010 | Soreide et al. |
| 2011/0037970 | A1* | 2/2011 | Rogers et al. .............. 356/28 |

OTHER PUBLICATIONS

Henderson, Tom, The Physics Classroom, Glenbrook South High School, Glenview Illinois, Aug. 2007, 2 pages.

Liem, A. et al., "25 W Ytterbium all fiber source at 1120 nm," Lasers and Electro-Optics, CLEO '01 Technical Digest, p. 216, ISBN: 1-55752-662-1 (2001).

International Search Report and Written Opinion, dated Aug. 7, 2008, for PCT Appl. No. PCT/US 08/05515, filed Apr. 30, 2008, 10 pages.

First Office Action, dated Mar. 19, 2012, for Chinese Patent Appl. No. 200880128956.2, 20 pages.

Supplementary European Search Report, dated Mar. 18, 2011, for European Patent Appl. No. 08779597.7, 7 pages.

Examination Report, dated Nov. 24, 2011, for European Patent Appl. No. 08779597.7, 3 pages.

Examination Report, dated Apr. 16, 2012, for European Patent Appl. No. 08779597.7, 3 pages.

Office Action, dated May 1, 2012, for U.S. Appl. No. 12/988,248, 15 pages.

Kameyama, S., et al., "Compact all-fiber pulsed coherent Doppler lidar system for wind sensing," Applied Optics, vol. 46, No. 11, Apr. 10, 2007; pp. 1953-1962.

Nilsson, J., "High-power fiber lasers: Surge to power," Stanford Center Annual Meeting, Sep. 19-21, 2005; 55 pages.

International Search Report directed to related International Patent Application No. PCT/US2012/025108, mailed Sep. 24, 2012; 3 pages.

Notice of Allowance mailed Oct. 16, 2012 for U.S. Appl. No. 12/988,248, filed Oct. 15, 2010; 5 pages.

U.S. Appl. No. 13/618,140, Chang et al., "Laser Wind Velocimeter with Multiple Radiation Sources," filed Sep. 14, 2012.

Maeda, M. W., et al., "An Electronically Tunable Fiber Laser with a Liquid-Crystal Etalon Filter as the Wavelength-Tuning Element," IEEE Photonics Technology Letters, vol. 2, No. 11, 1990; 3 pages.

Request for Re-Examination directed to related Canadian Patent No. 2,124,963, filed Jun. 29, 2012; 34 pages.

Re-Examination Notice directed to related Canadian Patent No. 2,124,963, mailed Oct. 31, 2012, from the Canadian Intellectual Property Office; 4 pages.

English-Language Translation of the Second Office Action directed to related Chinese Patent Application No. 200880128956.2, issued Dec. 12, 2012, from the State Intellectual Property Office of the People's Republic of China; 10 pages.

Notice of Allowance mailed Dec. 3, 2012 for U.S. Appl. No. 12/988,248, filed Oct. 15, 2010; 5 pages.

Supplemental Notice of Allowability mailed Dec. 31, 2012 for U.S. Appl. No. 12/988,248, filed Oct. 15, 2010; 4 pages.

* cited by examiner

LASER WIND VELOCIMETER WITH MULTIPLE RADIATION SOURCES

FIELD

This disclosure relates to the field of laser based velocity measurement of wind or solid objects.

BACKGROUND ART

Conventional laser Doppler velocimeters ("LDVs") transmit light to a target region (e.g., into the atmosphere) and receive a portion of that light after it has scattered or reflected from the target region or scatterers in the target region. This received light is processed by the LDV to obtain the Doppler frequency shift, $f_D$. The LDV conveys the velocity of the target relative to the LDV, v, by the relationship $v=(0.5)cf_D/f_t$ where $f_t$ is the frequency of the transmitted light, and c is the speed of light in the medium between the LDV and the target.

LDV's are have a wide range of applications including, but not limited to: blood-flow measurements, speed-limit enforcement, spaceship navigation, projectile tracking, and air-speed measurement. In the latter case the target consists of aerosols (resulting in Mie scattering), or the air molecules themselves (resulting in Rayleigh scattering).

Conventional LDVs for meteorological measurements or applications generally incorporate a single motorized telescope that takes measurements sequentially along different axes, or use three telescopes, switching from one to the next, and so on, to allow sequential measurements along the different axes. This approach is disadvantageous in that is does not enable simultaneous measurements of three components of velocity.

BRIEF SUMMARY

Therefore, what is needed is an LDV with more than one transceiver, and e.g., three or more transceivers, where all of the transceivers are transmitting a beam of light within a target region or regions substantially simultaneously. Using the plurality of transceivers each aimed at a different area of the target region allows for substantially simultaneous velocity measurements along a plurality of different axes, thus allowing for a multi-dimensional velocity determination. In one example, by simultaneously transmitting light to the different areas of the target regions, the accuracy of the readings is greatly improved while eliminating the need for any moving parts. In another example, the timeliness of the measurements is improved. What is also needed are improvements to LDVs that result in the use of eye-safe radiation sources, e.g., in the 1.4-1.6 micron range.

In one embodiment of the present invention, there is provided a laser velocimeter system comprising a coherent source configured to produce a coherent radiation beam, a modulator configured to receive the coherent radiation beam as input from the source and to produce a modulated radiation beam, one or more transceivers configured to receive the modulated radiation beam via a corresponding one or more optical fibers chosen from a first plurality of optical fibers, the one or more transceivers each configured to transmit the modulated radiation beam to a target region and to receive a reflected radiation signal from the target region, and, an optical mixer coupled to the one or more transceivers via a corresponding one or more optical fibers chosen from a second plurality of optical fibers, and coupled to the coherent source via one or more optical fibers chosen from a third plurality of optical fibers. The optical mixer is configured to receive the one or more reflected radiation signals from the corresponding one or more transceivers, receive one or more reference radiation beams from the coherent source, and determine, for each of the one or more transceivers, a corresponding one or more Doppler shifts based on the respective one or more reference beams and the corresponding one or more reflected radiation signals.

In another embodiment of the present invention, a method of determining a velocity of scatterers in a target region is provided comprising modulating a coherent radiation beam containing one or more frequencies, transmitting the modulated radiation to one or more target regions in the form of one or more radiation beams, receiving one or more reflected radiation signals from the target region, combining the received reflected radiation signals with one or more reference radiation beams, and, determining the velocity of scatterers in the target region based on the combined received and reference radiation.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the relevant art(s) to make and use the present invention.

Figure 7:
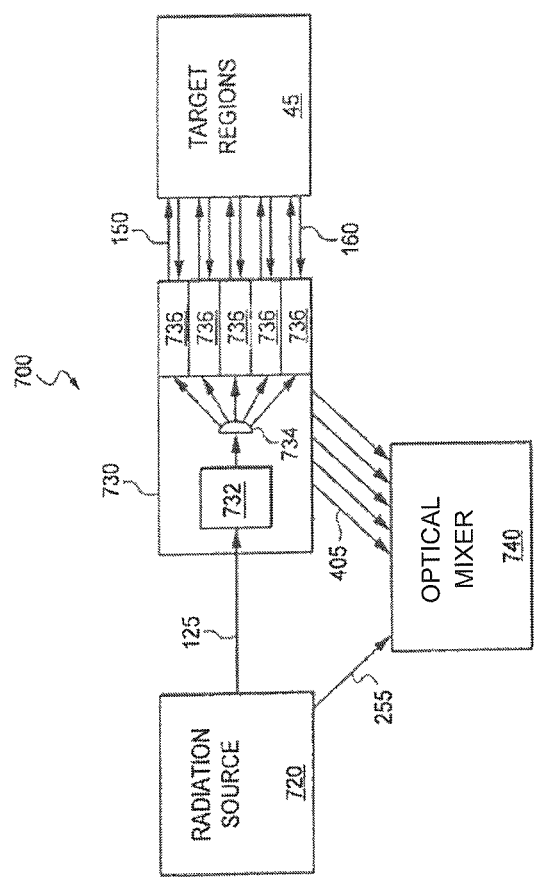
Figure 8:
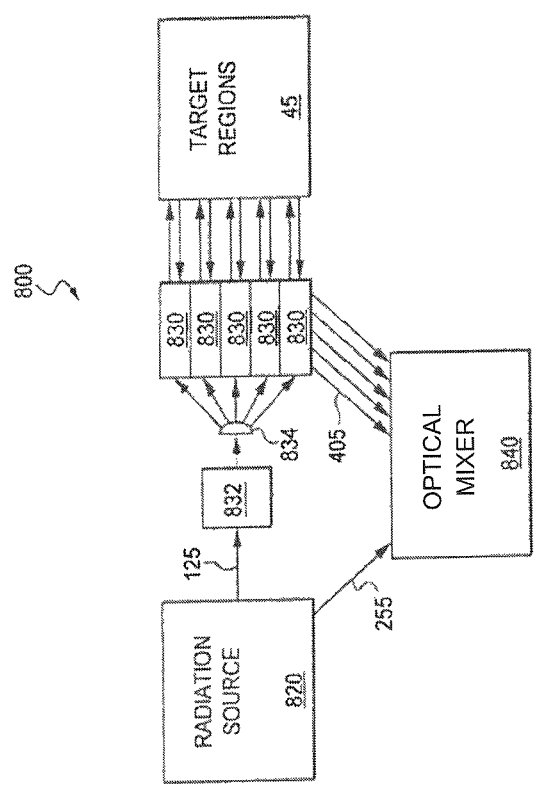
Figure 9:
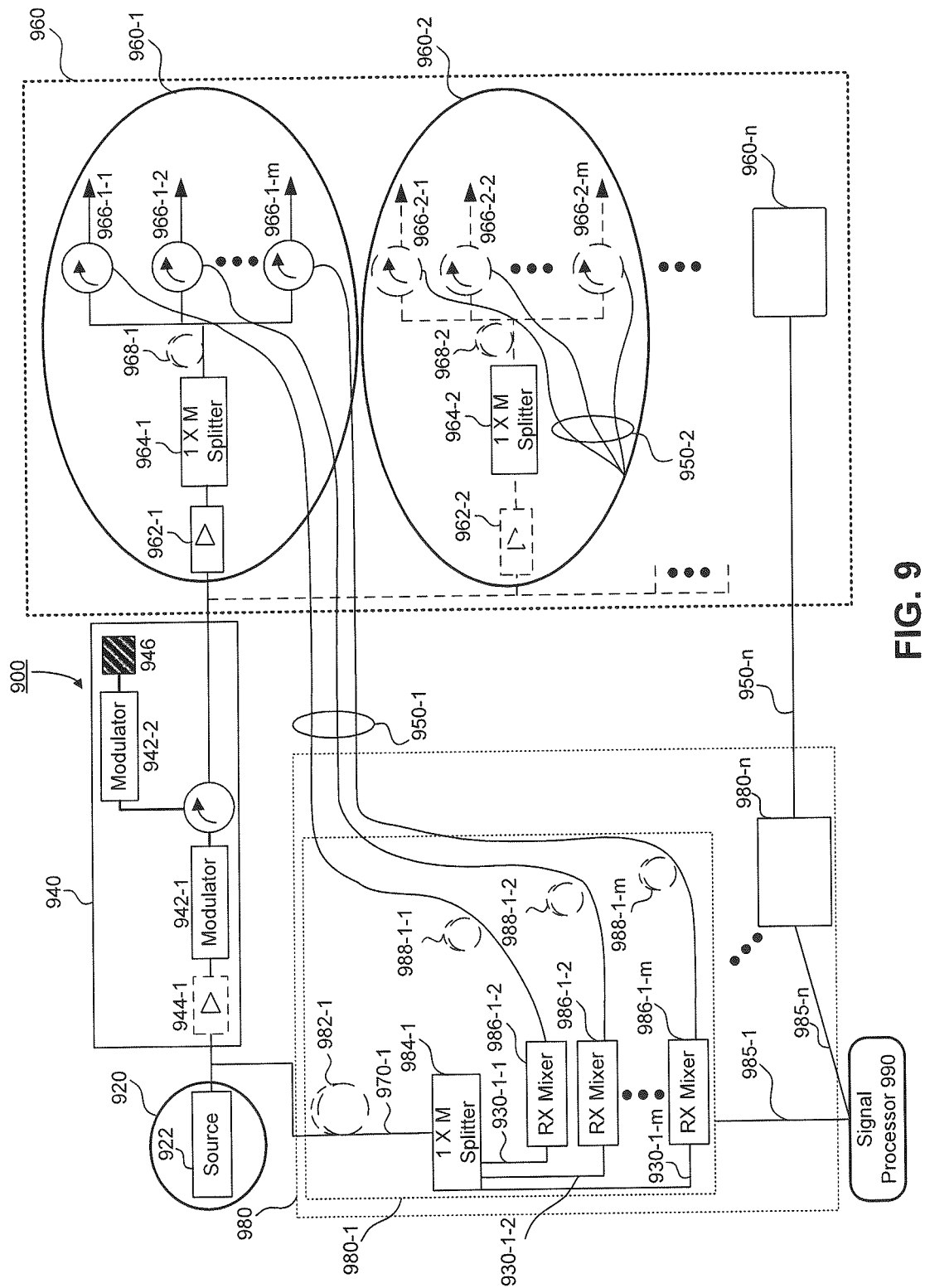

FIGS. 7, 8, and 9, illustrate various embodiments of laser Doppler velocimeters with multiple transceivers.

Figure 10:
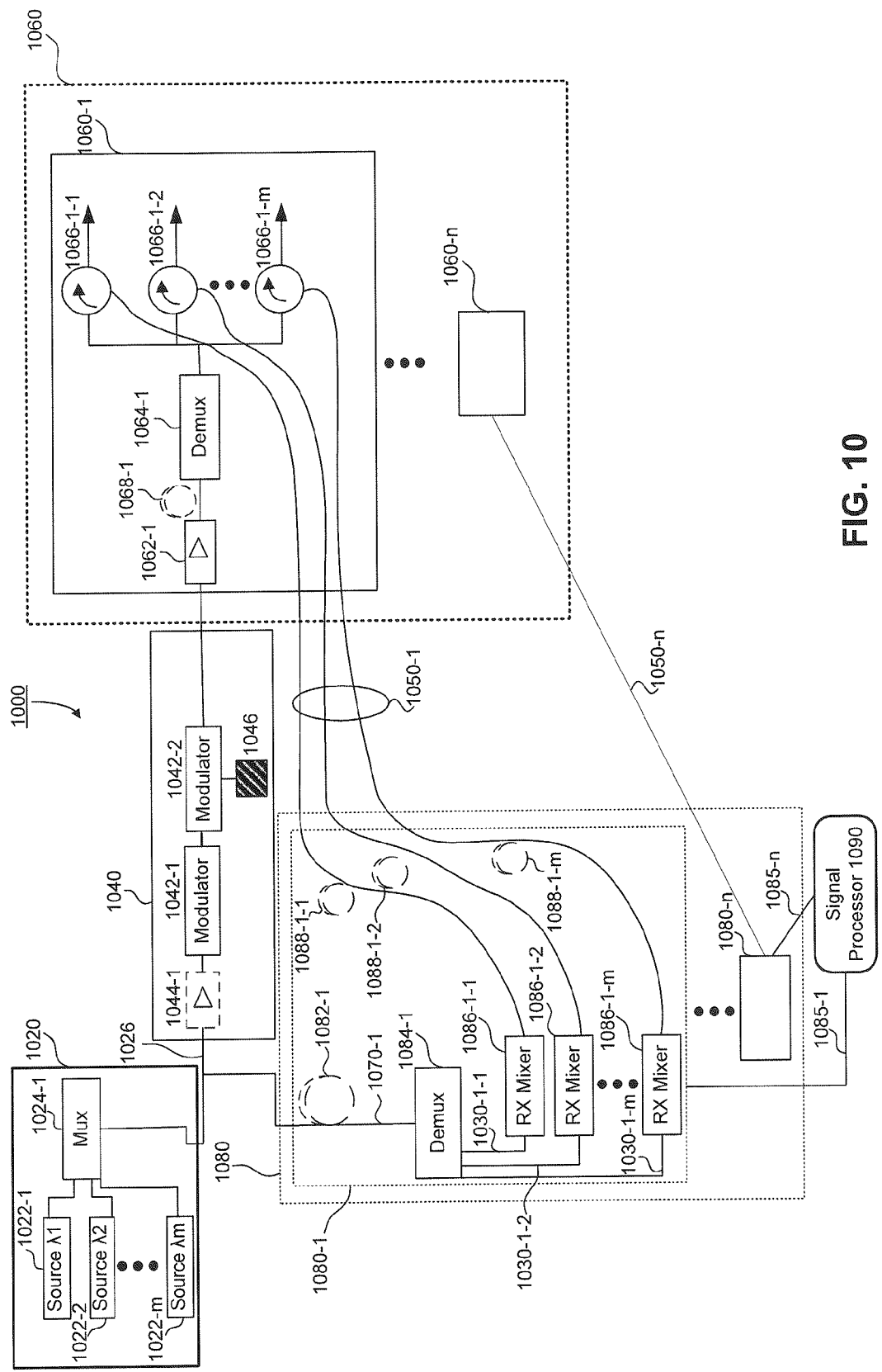
Figure 11:
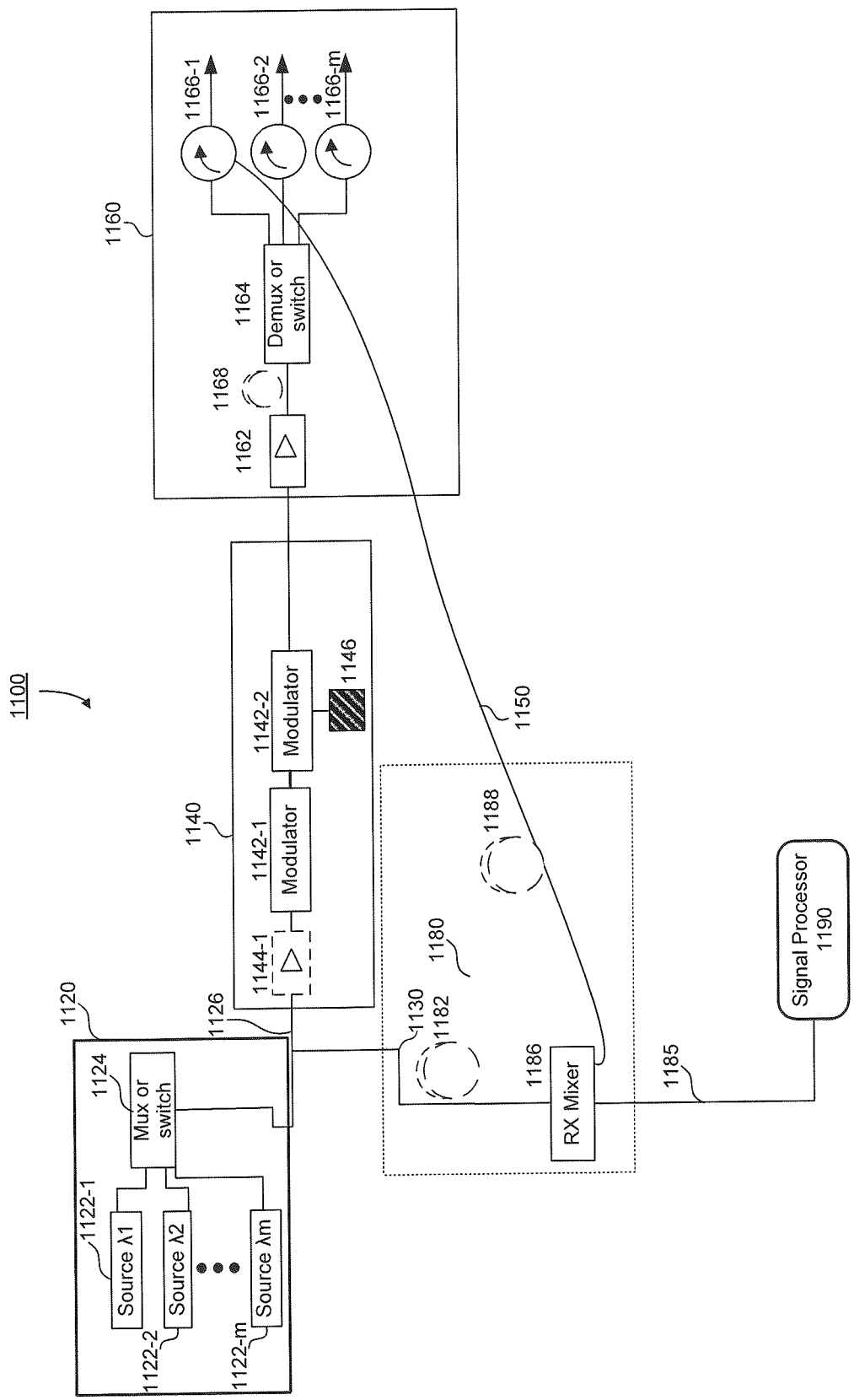

FIGS. 10 and 11 illustrate various embodiments of laser Doppler velocimeters with multiple transceivers and multiple radiation sources.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the present invention. The scope of the present invention is not limited to the disclosed embodiment(s). The present invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

Figure 1:
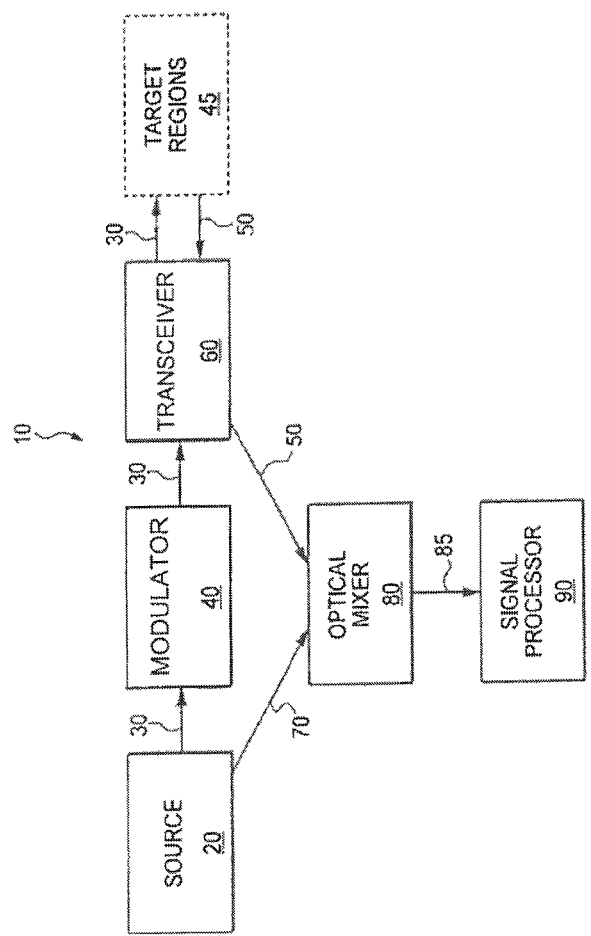
FIG. 1 illustrates a laser Doppler velocimeter.

An example of an air speed LDV 10 is illustrated in FIG. 1 and as disclosed in U.S. Pat. No. 5,272,513, the disclosure of which is incorporated herein by reference in its entirety. The LDV 10 includes a source 20 of coherent light which may, if desired, be polarized. The source 20 projects a first coherent beam of light 30 into a modulator 40. The beam shaper 40 expands and collimates the beam 30 after which beam 30 enters a transceiver 60. The transceiver 60 projects the beam 30 in nearly collimated form into the target region 45.

The collimated beam strikes airborne scatterers (or air molecules) in the target region 45, resulting in a back-reflected or backscattered beam 50. A portion of the backscattered beam 50 is collected by the same transceiver 60 which transmitted the beam 30, or to an adjacent receiver (not shown). The case where the same transceiver transmits and receives the light is known as a monostatic configuration, while the case of separate transmitters and receivers is known as a bistatic configuration. Monostatic configurations can only receive backscattered light. Bistatic configurations can be arranged to receive light that is substantially backscattered or at any other angle relative to the transmitted beam 30.

The light 50 collected by transceiver 60 is then combined with a separate reference beam of light 70 in an optical mixer 80. An ideal optical mixer combines the two beams in such a way that they have the same polarization and occupy the same space, and directs the result onto a photo detector with a bandwidth sufficient to detect the measured Doppler frequency shift. The photo detector produces an electrical current 85 which includes a component whose frequency is the mathematical difference between the frequency of the reference beam 70 and the backscattered beam 50. The electrical current 85 is then analyzed by a signal processor 90 (e.g. electrical spectrum analyzer or a frequency counter) to determine the frequency difference and calculate the relative velocity component along the axis of the transceiver 60 between the LDV 10 and the target region 45.

Ambiguities regarding whether the measured relative frequency is either positive or negative can be resolved by using the "in-phase and quadrature" detection method, as is known in the art. Another approach to resolving these ambiguities is to apply a stable, constant frequency shift either to the transmitted beam 30 or to the reference beam 70 (e.g. by using an acousto-optic cell). This creates an alternating current component in the electrical signal 85 with a frequency that is the sum of the constant frequency shift and the Doppler frequency shift, removing the directional ambiguity. An LDV wherein the frequency of the transmitted beam 30 and the frequency of the reference beam 70 are identical is said to use homodyne detection. Heterodyne detection is used when the frequencies of the transmitted beam 30 and reference beam 70 are different.

The reference beam 70 is selected to have a well-defined and stable optical frequency that bears a constant phase relationship with the transmitted beam 30. This is known as coherence. The requirement for coherence is easily achieved by using a laser as the source 20 and tapping the source 20 to create the reference beam 70 by means of an optical splitter (not shown).

Source 20 can be either a $CO_2$, Nd:YAG, or Argon Ion laser (preferably lasing in the fundamental transverse mode and in a single longitudinal mode). However, air-speed targets (aerosols and/or molecules) generate very weak return signals compared to solid objects. Thus air-speed LDV's incorporating these laser sources that work over a range of thousands or even tens of meters require large amounts of laser power and are thus too large, bulky, heavy, fragile and possibly dangerous to be used in many desirable applications like air-speed determination for helicopters.

However, source 20 can also be a lightweight, low-cost, highly efficient, rare-earth-doped glass fiber (referred to hereafter as a fiber laser). Fiber lasers have several enormous advantages over other laser sources. Fiber lasers can be efficiently pumped by laser diodes whose emission wavelengths have been optimized for excitation of the rare-earth dopant. This makes the fiber lasers very energy efficient and compact, eliminating the need for cooling systems, flash lamps, and high current electrical sources. Moreover the glass fiber serves as a flexible waveguide for the light, eliminating the need for bulky optical components like mirrors and lenses that require rigid mechanical mounts in straight lines with stringent alignment tolerances. Fiber lasers are also more adaptable than solid-state lasers: the pulse repetition frequency ("PRF") and pulse width in fiber lasers may be changed "on the fly," while the PRF and pulse width in solid-state lasers are bound to narrow ranges or are even fixed. Source 20 can also be comprised of a laser diode coupled to an optical fiber.

Despite advances in conventional LDV's, improvements are still necessary. Sometimes it is desirable to locate the source laser 20 at a different, more accessible location than the transceiver 60. For example, in a wind turbine generator ("WTG") application the telescope can be located on the turbine, while its source laser and control electronics are best located in the nacelle or at the base of the tower that supports the WTG for ease of maintenance. In sailing applications the source is preferably located within the hull of the ship where it is protected from exposure to the elements.

These remote configurations can be made conveniently by using optical fiber to connect the source laser 20 and the transceiver 60. Problems have occurred, however, in that the large optical power required for air speed measurements becomes limited by a non-linear effect that occurs in fiber optics known as stimulated Brillouin scattering ("SBS"). In fact, the longer a fiber optic is, the lower this limit becomes. The SBS power limit depends on other factors known to those skilled in the art, but it is a fundamental physical property of light traveling through transparent media and cannot be ignored.

Additional exemplary systems are taught in co-owned U.S. application Ser. No. 12/988,248 and PCT Appl. No. WO 2009/134221, which are incorporated by reference herein in their entireties.

Embodiments of the present invention provide a velocimetry system for an LDV with no moving parts and which is lightweight enough to be used for many different applications which were, up to this point, not practical for LDVs. The disclosed LDV includes an active lasing medium, such as e.g., an erbium-doped glass fiber amplifier for generating and amplifying a beam of coherent optical energy and an optical system coupled to the beam for directing the beam a predetermined distance to a scatterer of radiant energy. The reflected beam is mixed with a reference portion of the beam for determining the velocity of the scatterer.

In using this device to measure wind velocity in the transceiver focal volume, the velocity component that is measured is that component along the axis of the transceiver. Therefore, for measurement of the "n" components of velocity, n independent measurements must be made along n non-collinear axes (where n is an integer). To accomplish this task n duplicate transceivers are disclosed, each carrying either a continuous wave ("CW") beam or are simultaneously pulsed with a common seed laser source. Simultaneous pulsing and transmission through the n transceivers has the advantage that the velocity measurements each arise from the same moment in time, instead of from sequential moments in time. Thus, the resulting velocity determinations are more accurate as a result of simultaneous pulsing and transmission instead of sequential transmission.

By using optical fiber for both generation of the laser energy as well as wave guiding of the energy, the present disclosure provides a single, mechanically flexible conduit for light. This configuration allows the system to be more robust to vibration and temperature variation than a corresponding system comprising free space optical components. The only point at which light leaves the optical fiber system is for projection from the respective transceivers. Each of the optical fibers that transmits light is also the same fiber used to receive scattered light and thus the aerosol-scattered return beam is automatically aligned with the respective transceiver-fiber optic collection systems.

The use of fiber lasers such as e.g., erbium-doped optical fiber also has advantages in terms of the overall energy efficiency of the system. Because diode lasers are now available at the optimal pump wavelength of erbium doped glass, the erbium wave guide can be efficiently pumped by launching pump radiation down this wave guide. Thus, the system has greatly reduced cooling requirements and can operate off of a low voltage battery supply.

The disclosed velocimeter system is also eye-safe, lightweight, and easily scaled to high energy per pulse or CW operation. As described above, the velocimeter has "n" lines of sight. Thus, in order to determine an object's velocity or the wind velocity in one or more target regions, n transceivers are used, each simultaneously projecting a beam of light along a different axis. To determine three-dimensional velocity, as with wind velocity, three transceivers are used. To determine two- or one-dimensional velocity, e.g., for a car or boat moving on a plane or in a line, fewer transceivers may be used. The laser beams projected from the n transceivers are each pumped simultaneously and arise from a single laser source. The source may be co-located with the n transceivers, or may be located remotely with respect to the n transceivers. If the laser source is remotely located, fiber optic cables are used to carry the generated light beams to each transceivers. As described below in greater detail, a seed laser from the source is amplified and, if desired, pulsed and frequency offset, and then split into n source beams. The n source beams are each delivered to an amplifier assembly that is located within the n transceiver modules, where each of the n transceiver modules also includes an optical system such as a telescope. Amplification of the n source beams occurs at the transceiver modules, just before the n beams are transmitted through the optical system to one or more target regions. Thus, when the n source beams are conveyed through connecting fibers from the laser source to each of the n transceivers, the power of each of the source beams is low enough so as not to introduce non-linear behaviors from the optical fibers. Instead, power amplification occurs in the transceiver module, just before transmission from the optical system. Consequently, fiber non-linear effects are not introduced into the system.

The placement of the power amplifier within the transceiver modules just before laser beam projection through a lens reduces the effect of nonlinear fiber behavior that is normally observed when there is a greater propagation distance between the power amplifier and the lens. In this way, the disclosed velocimeter is able to use a single seed laser and amplifier assembly that is remote from the power amplifier. The seed laser generates a beam that may be amplified, pulsed, and frequency shifted before the beam is split, if necessary, and directed to the remote power amplifiers. Power amplification only occurs just before transmission of the source beam through the lenses. Thus, as long as the amplified result is still within the linear operating region of the fiber to the remote amplifier, the disclosed velocimeter avoids the problems associated with non-linear fiber operation.

By using the disclosed velocimeter, object or wind velocities may be measured with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. The n beams may each be directed towards the same target region or may be directed to multiple target regions. A single beam may be used to simultaneously measure velocities at multiple points or span along a single axis. Additionally, the disclosed velocimeter has no moving parts, and is thus of reduced size and improved durability. As explained below, the disclosed velocimeter may be used with a platform motion sensing device such as e.g., an inertial measurement unit ("IMU") or global positioning satellite ("GPS") unit so that the motion of the velocimeter platform may be compensated during calculation of the measured velocities. Thus, because of the lightweight and non-bulky nature of the velocimeter, and because of the velocimeter's ability to compensate for platform motion, the disclosed LDV may be mounted on any moving platform (e.g., a helicopter, a boat, etc.) and still obtain highly accurate readings.

Figure 2:
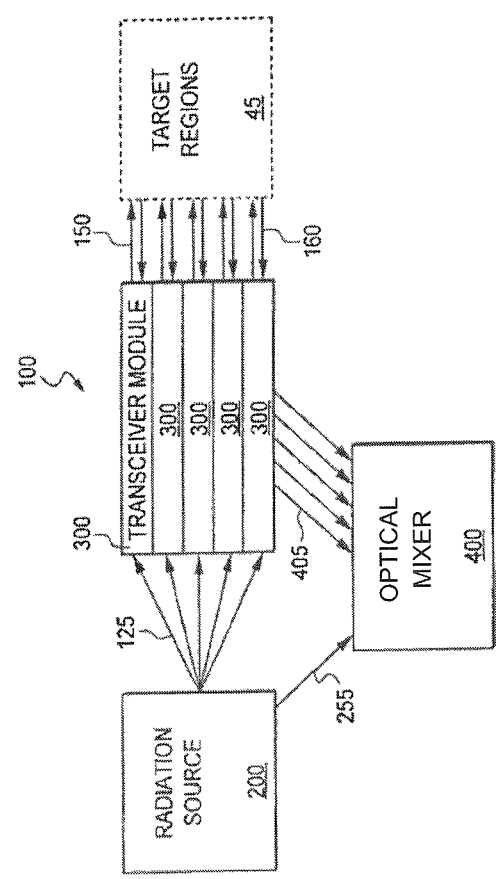
FIG. 2 illustrates an embodiment of a laser Doppler velocimeter with multiple transceivers.

FIG. 2 is a block diagram illustrating an n-axis laser Doppler velocimeter system 100. The system 100 includes a radiation source module 200, n transceiver modules 300, and an optical mixer 400. Each of the modules are described in detail below. The radiation source module 200 generates n source beams 125 to the n transceiver modules 300. The n transceiver modules 300 are for transmitting n beams of light 150 and receiving n scattered or reflected beams of light 160. The transceiver modules 300 may be located in a physically separate location than the radiation source 200 and the optical mixer 400. Alternatively, depending upon the application, all modules may be co-located. The radiation source module 200 also outputs a reference beam 255 to the optical mixer 400. The optical mixer 400 combines the reference beam 255 with each of the scattered/reflected beams 160 received by the n transceiver modules 300 that are passed on to the optical mixer 400 via optical fiber 405. Doppler shifts and hence, velocities, are calculated from the results of the combined signals.

Figure 3:
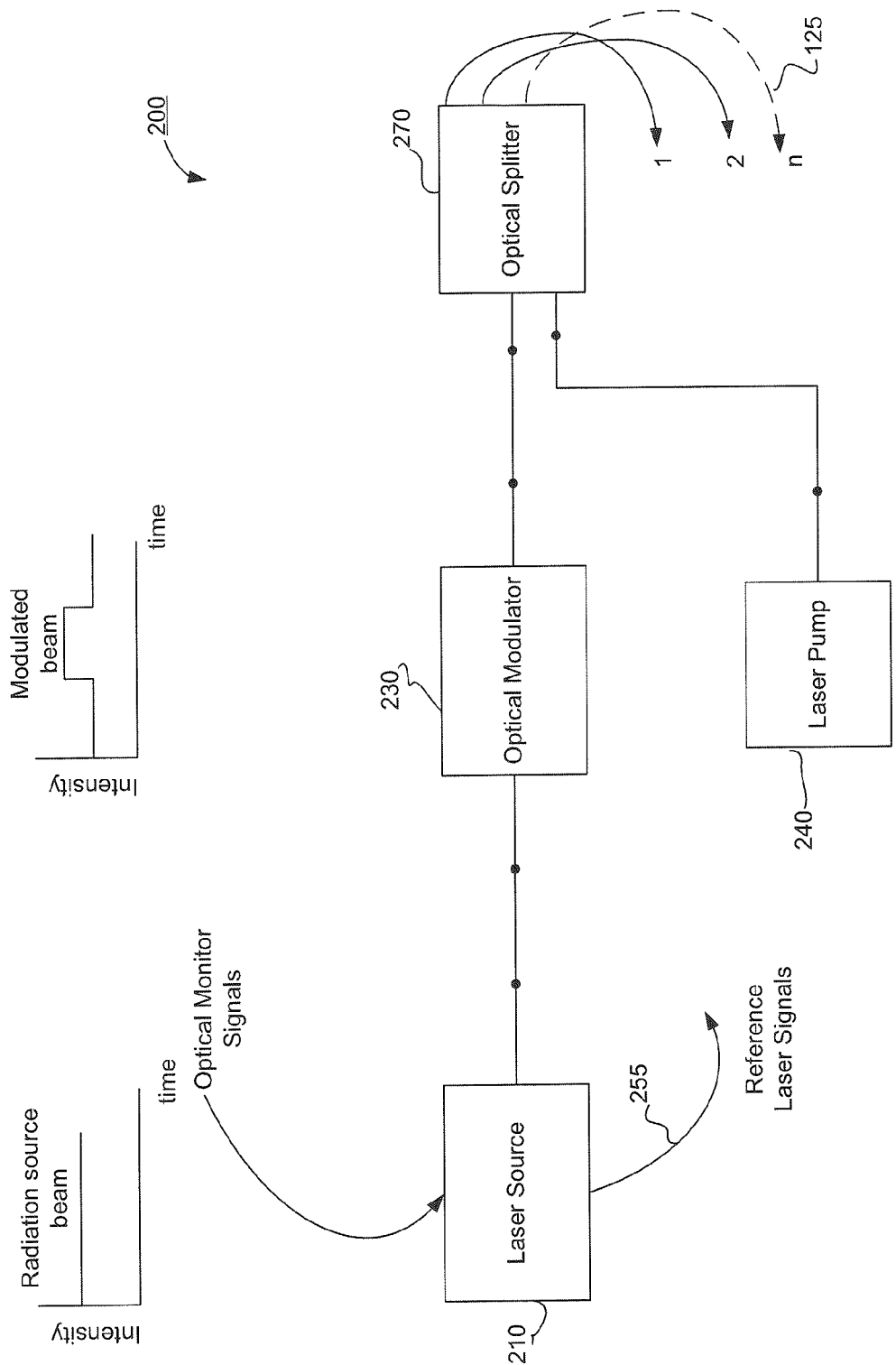
FIG. 3 illustrates an embodiment of a radiation source module of the laser Doppler velocimeter.

The radiation source module 200 is illustrated in FIG. 3. The radiation source module 200 includes a laser source 210, an optical amplifier (such as e.g., a fiber optic amplifier, illustrated a 330 in FIG. 4) and an optical splitter 270. The radiation source module 200 may also include an optical modulator 230 to provide a frequency shift (using e.g., an acousto-optic modulator), a polarization shift (using e.g. a Faraday rotator), or both, as well as to induce a temporal pulse shape (i.e. amplitude modulation).

Each of these components of the radiation source module 200 are coupled together and are described in greater detail below.

Figure 4:
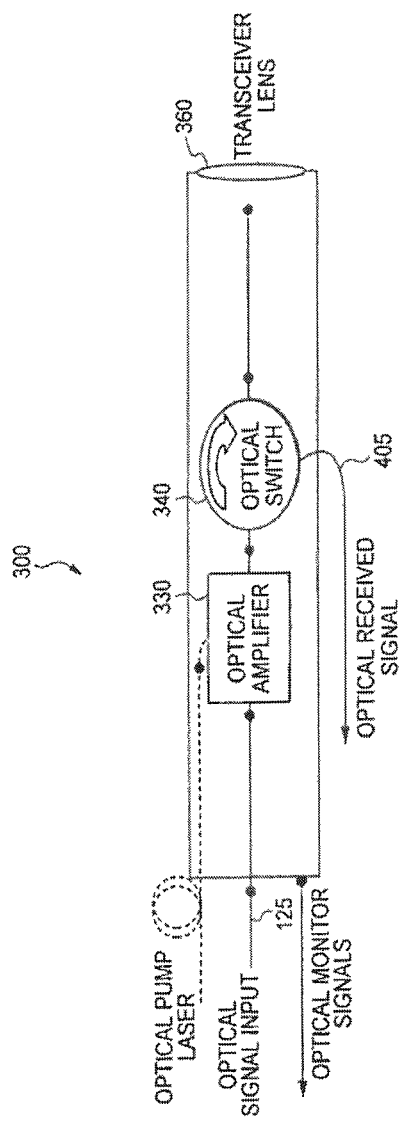
FIG. 4 illustrates an embodiment of a transceiver module of the laser Doppler velocimeter.

The laser source 210 and associated drivers and controllers provide the initial laser energy that may be feed into optical amplifier (see FIG. 4, feature 330). When the laser source output is combined with an amplifier, the result is a high power laser output. Typical laser sources 210 are small laser diodes (single-frequency or gain-switched), short-cavity fiber lasers, and miniature solid state lasers such as, for example, nonplanar ring oscillators ("NPROs"), or hybrid silicon lasers. The output from the seed laser source 210 is directed towards the optical modulator 230, that may induce a frequency shift, a polarization shift, or both as well as provide a temporal amplitude modulation. A reference laser signal 255 is also output from the laser source 210.

A frequency shifter (such as an acousto-optic modulator ("AOM")) (as a possible component of the optical modulator 230) and associated RF drivers may provide a radio-frequency ("RF") offset to the laser source output. This offset facilitates the later determination by a signal processor of the direction of any detected motion. The offset is provided by utilizing the acousto-optic effect, i.e., the modification of a refractive index by the oscillating mechanical pressure of a sound wave. In an AOM, the input laser beam is passed through a transparent crystal or glass. A piezoelectric transducer attached to the crystal is used to excite a high-frequency sound wave (with a frequency in the RF domain). The input light experiences Bragg diffraction at the periodic refractive index grating generated by the sound wave. The scattered beam has a slightly modified optical frequency (increased or decreased by the frequency of the sound wave). The frequency of the scattered beam can be controlled via the frequency of the sound wave, while the acoustic power is the control for the optical powers. In this way, a frequency shifter may be used to provide a frequency offset to the laser source output. An AOM may also be used as an optical modulator 230 to modulate laser signals from the source laser 210 in order to obtain pulsed LIDAR measurements.

Additional modulation of the seed laser output may be provided using an optical modulator 230 (such as e.g., semiconductor optical amplifier ("SOA")). Although the SOA is not necessary for the system 100 to function, SOA-induced pulsing may be used to optimize the extinction ratio in the pulses. The SOA is capable of providing primary as well as secondary modulation of the seed laser source. The SOA may also be used to provide optical amplification to the laser source signal. The laser source 210 can also be modulated electronically.

An optical amplifier (feature 330 in FIG. 4) can be either a semiconductor-based booster optical amplifier ("BOA") or a fiber optic amplifier. The fiber optic amplifier includes a length of fiber doped by a rare earth element such as e.g., erbium (Er), erbuim-ytterbium (Er:Yb), etc. A single mode ("SM") or multimode ("MM") pump diode is used to excite the dopant material within the doped fiber. Optical signals from the SOA may be combined with the pump signals via a wavelength division multiplexer ("WDM") or a tapered fiber bundle ("TFB"). In the optical amplifier 330, the source light is amplified to a level below the power limit dictated by optical damage and nonlinear effects of the fiber. Amplifier spontaneous emission from the optical amplifier 330 is managed via the use of narrowband bulk filters or fiber Bragg grating ("FBG") based filters.

Once filtered, the amplified light is passed through an optical splitter 270. The optical splitter 270 splits the light amongst the different transceiver modules 300. As explained below, the light from the radiation source module 200 is transmitted to optical amplifiers 330 located within each individual transceiver module 300. The use of an optical splitter instead of a switch or multiplexer allows the radiation source module 200 to be designed without any moving parts. In other words, no motors or switches need be used.

Light output from the optical splitter 270 and hence the radiation source module 200 is directed to the n transceiver modules 300 by way of n connecting fibers 125. The connecting fibers 125 allow the radiation source module 200 to be remotely located (if desired) from the n transceiver modules 300. As described above, the lasers carried by the connecting fiber bundle 125 are each at a sufficiently low power to avoid introducing the non-linear effects of the fiber. The fiber bundle 125 consists of multiple fibers of varying core sizes to carry different optical signals between the radiation source module 200 and the n transceiver modules 300. These optical signals include the amplified source laser signal as well as a multimode pump laser signal from a pump laser 240 for the pumping of amplifiers at each of the n transceiver modules 300. Furthermore, optical signals including optical monitor signals from the transceiver modules 300 are carried back to the radiation source module 200. The optical monitor signals can trigger the shutdown of the radiation source module 200 in the event of a malfunction or error at the transceiver modules 300.

One of the n transceiver modules 300 is illustrated in FIG. 4. Each of the transceiver modules 300 includes an optical amplifier 330 (such as a fiber optic amplifier), an optical switch 340 (such as e.g., a fiber optic circulator), and a transceiver lens 360 used to transmit and receiver optical signals from the target region 45 (of FIG. 2).

Amplified source laser signals from the radiation source module 200 transmitted via optical fibers 125 to each of the transceiver modules 300 are further amplified within each of the transceiver modules 300 via the optical amplifier 330. The optical amplifier 330 includes a rare earth doped fiber (such as e.g., Er:Yb double clad fiber). Pump light can be introduced into the rare earth doped fiber via a tapered fiber bundle ("TFB") in a co-propagating or counter-propagating manner relative to the seed laser signal from the radiation source module 200. The source laser signal is thus further amplified within the transceiver module 300. The output of the optical amplifier 330 is then directed towards an optical switch 340 via TFBs or WDMs.

The optical switch 340 (such as e.g., a fiber optic circulator) allows a single lens 360 to be used to transmit and receive light, thus allowing the sensor to operate in a monostatic geometry. In the case where multiple lenses are used (at least one for transmitting a light beam and at least one for receiving a reflected light beam, e.g., a bistatic geometry), the optical switch 340 may not be necessary. The optical switch 340 may also be used in conjunction with an amplified spontaneous emission filter. Such a filter might be bulk optic or an FBG based filter. Such a filter may be installed to maintain laser eye safety, as necessary. It is often the case that these filters divert the amplified spontaneous emission ("ASE") to another fiber optic. This diverted laser can be used to monitor the operation of the optical amplifier 330 to adjust the amplifier's power, or as a safety feature in remotely pumped applications. As a safety feature, a measurable drop in the diverted ASE could mean that the fiber cable has been severed and that the pump should be shutdown immediately. Alternatively, to reduce ASE in pulsed applications, the pump lasers themselves may be pulsed in synchronization. Pulsing the pump lasers also reduces power consumption, thus facilitating the use of battery operated systems.

Source light that reaches the transceiver lens 360 is projected onto a target object or region 45 (of FIG. 2). Scattered or reflected light is returned to the transceiver module 300. The transceiver lens 360 collects the scattered light back into the fiber. In the case of monostatic operation, the transceiver lens 360 focuses light back into the transmit fiber where the scattered light is separated out from the transmit beam by the optical switch 340. Otherwise, for example, in the case of bistatic operation, the scattered light is focused into a different fiber. The collected scattered light is carried via fiber 405 to the receiving module 400 of FIG. 2.

Figure 5:
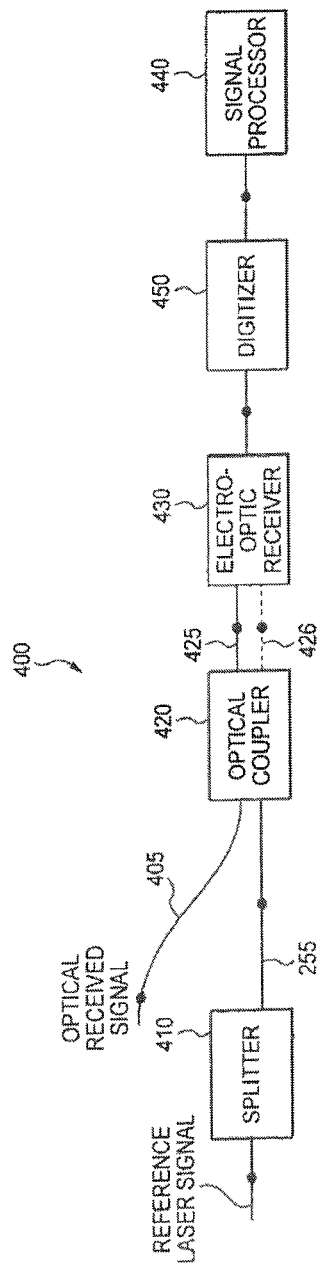
FIG. 5 illustrates an embodiment of a receiver module of the laser Doppler velocimeter.

The optical mixer 400 is explained in greater detail with reference to FIG. 5. The optical mixer 400 includes an optical coupler 420 (e.g. a fiber optic coupler) for combining the received signal 405 with the reference laser signal 255 into the same space (e.g., an output optical fiber). This combined signal 425 is then directed onto an electro-optic receiver 430 (e.g. a photodiode) that converts the mixed optical signal into an electrical signal. This signal is then digitized (via a digitizer 450) for convenient signal processing in order to extract the Doppler frequency shift (via a signal processor 440). If n transceiver modules 300 are used then the reference laser signal 255 must be split into n beams by splitter 410 for mixing with n optical mixers 400. If n is large, then an optical amplifier may be required to boost the power of the reference beam 255 before splitting.

An optical coupler such as 420 (e.g., a 3 dB fiber optic coupler) generally produces two output beams 425, 426 of opposite phase. Beam 425 is the combined signal, as explained above. Beam 426 may also be used and applied to a second electro-optic receiver to create a balanced receiver, as described in U.S. Pat. No. 4,718,121, the disclosure of which is incorporated herein by reference. Balanced receivers are preferably used because they use all of the mixed signal, and result in the cancellation of intensity noise in the reference laser beam 255.

Effective optical mixing also requires matching the polarizations of the received signal 405 and the reference laser signal 255. Mitigating the loss of mixing efficiency due to uncontrolled polarization may require a more complicated optical mixing circuit than the one shown in FIG. 5, such as a polarization diversity receiver, described in U.S. Pat. No. 5,307,197, the disclosure of which is incorporated herein by reference.

The signal processor 440 receives the signal from the digitizer 450 and converts the signal into frequency space, calculates line-of-sight speeds from the Doppler shifts along each line-of-sight (i.e., from each of the n transceivers 300), and combines these speeds to determine a single velocity for the target object or region measured. Additionally, the signal processor 440 may use input from a motion sensor (preferably an attitude heading reference system or an IMU and a GPS or ground speed detection device) to determine if the platform upon which the transceivers 300 are mounted is moving. Any platform motion is detected and used to adjust or correct the measured velocity, as described in connection with FIG. 6.

Although not all applications of the disclosed LDV 100 require platform motion compensation, the disclosed LDV 100 (or at least the transceiver module 300 of the LDV 100) is portable and may easily be located on a moving platform such as a boat, ground vehicle or aircraft. As discussed above, the LDV 100 directly measures the relative motion of air scatterers with respect to the transceiver module 300 by detecting the Doppler frequency shift. If the LDV 100 is fixed to the ground, then its measurement is the wind speed and direction. However, an LDV 100 undergoing linear motion measures the relative wind speed and direction. If the linear speed and direction of the moving platform is known, then the wind speed can be extracted from the relative wind measurement. Additionally, the LDV 100 may undergo both linear and rotational motion as encountered on floating platforms. The rotational motion introduces an additional frequency shift since the optical focal volumes are moving rapidly through the air. This frequency shifts yields a speed measurement that is not necessarily useful to (1) meteorologists since it does not represent wind or (2) navigators since it does not represent relative wind. This rotational component must be isolated and compensated for in order to report useful wind data.

Figure 6:
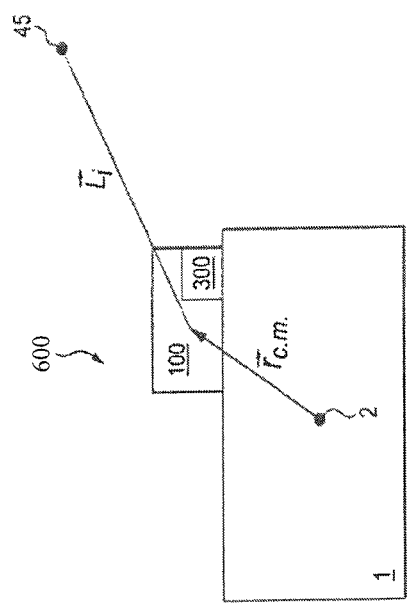
FIG. 6 illustrates a vector diagram of a motion compensation scheme for the laser Doppler velocimeter.

Referring to FIG. 6, a vector diagram of a motion compensation scheme 600 for the disclosed LDV is depicted. Platform motion of platform 1 is composed of linear translations of the platform's center of mass 2 and rotations about the center of mass 2. Mounted on the platform 1 is an LDV 100 with n transceiver modules 300. At least one of the n transceiver modules 300 (e.g., the $i^{th}$ transceiver module 300) is co-located with the LDV 100 on the platform 1. The velocity of the $i^{th}$ focal volume or target region 45 is given by Equation 1, below:

$$\vec{v}_{fi} = \vec{v}_{c.m.} + \vec{\omega} \times \vec{r}_i, \qquad \text{Eq. 1.}$$

where $\vec{v}_{c.m.}$ is the linear velocity of the center of mass 2 of the platform 1 (and thus the LDV 100), $\vec{\omega}$ is the angular velocity of the platform 1, and $\vec{r}_i$ is the displacement vector from the center of mass 2 of the platform 1 to the ith focal volume or target region 45. The displacement vector is $\vec{r}_i = \vec{r}_{c.m.} + \vec{L}_i$, where $\vec{r}_{c.m.}$ is a vector from the center of mass 2 of the platform 1 to the transceiver modules 300 and $\vec{L}_i = f\hat{L}_i$ and is a vector from the ith transceiver module 300 to the ith focal volume or target region 45. The magnitude factor f is either the focal length in a focused system or the range in a range-gated system. The Doppler frequency shift created by this velocity is proportional to its component ($\delta_i$) along the laser line of sight $\hat{L}_i$: The $i^{th}$ Doppler frequency shift is equal to $2\delta_i/\lambda$, where $\lambda$ is the laser wavelength and:

$$\delta_i = \vec{v}_{fi} \cdot \hat{L}_i = \vec{v}_{c.m.} \cdot \hat{L}_i + (\vec{\omega} \times \vec{r}_i) \cdot \hat{L}_i. \qquad \text{Eq. 2}$$

The first term of Equation 2 (i.e., $\vec{v}_{c.m.} \cdot \hat{L}_i$) is the desired shift due to the relative linear motion between the $i^{th}$ target region 45 and the moving platform 1. The second term of Equation 2 (i.e., $(\vec{\omega} \times \vec{r}_i) \cdot \hat{L}_i$) represents the rotational motion and can be written as $(\vec{r}_{c.m.} \times \hat{L}_i) \cdot \vec{\omega}$ using the rules of cross products with the fact that $(\vec{\omega} \times \vec{L}_i) \cdot \hat{L}_i = 0$. The procedure for motion compensation in a three-dimensional system is to measure the three raw Doppler shifts and the angular velocity with an IMU, then subtract off $(\vec{r}_{c.m.} \times \hat{L}_i) \cdot \vec{\omega}$. This corrected frequency shift is used to compute the three-dimensional relative wind at the $i^{th}$ target region 45.

The angular velocity and attitude (pitch/roll angle) of a moving platform may change rapidly with time. It is important to measure the Doppler shift in a short amount of time so as to allow an assumption that the state motion is frozen (thus allowing the assignment of one value of angular velocity and attitude to each measured Doppler frequency shift). Accordingly, the laser pulse repetition frequency ("PRF") and the number of pulses $N_{acc}$ are chosen so that the total time of data collection (i.e., $N_{acc}$/PRF) is less than 200 milliseconds, for example. The angular velocity is measured before and after the $N_{acc}$ pulses are collected and the average value is used in the compensation calculations for $\vec{\omega}$.

Although LDV 100 has been described in reference to the system and module architectures depicted in FIGS. 2-5, these architectures are exemplary and are not intended to be limiting. For example, FIG. 7 illustrates an additional LDV architecture in the form of LDV 700. As in LDV 100 (of FIG. 2), LDV 700 includes a source module 720, a transceiver module 730 and a optical mixer 740. However, in LDV 700, the source module 720 does not include a splitter. Instead, radiation generated at the source module 720 is conveyed to the transceiver module 730, where the generated radiation is amplified by amplifier 732 and then split via splitter 734 for use by the n transceivers 736 in the transceiver module 730. In LDV 700, only one remote amplifier 732 is used instead of n remote amplifiers.

FIG. 8 illustrates an additional LDV architecture in the foam of LDV 800. Here, LDV 800 includes a source module 820, one or more transceiver modules 830 and an optical mixer 840. The source module 820 does not include a splitter. Also, the transceiver modules 830 do not include amplifiers. Instead, an external amplifier 832 and splitter 834 are used. Radiation is generated at the source module 820 is conveyed to the remote amplifier 832 where it is amplified and then split via splitter 834 for delivery to the n transceiver modules 830. As in LDV 700 (of FIG. 7), only one remote amplifier 832 is used in LDV 800.

The disclosed LDV embodiments have been explained in the context of fiber-optic-connected modules in a way that allows the transceiver modules 300, 730, and 830 and optical amplifiers 330, 732, and 832 to be remotely located from the radiation source modules 200, 720, and 820. The transceiver modules 300, 730, and 830 need not include any electronics and can be purely optical modules. Motion compensation, laser sources, and signal processing occurs at the radiation source modules 200, 720, and 820 and optical mixers 400, 740, and 840. Thus, the operation of the transceivers 300, 730, and 830 is significantly improved due to less noise from the radiation source modules 200, 720, and 820 and receiver modules 400, 740, and 840, greater mounting stability and easier maintenance. It is to be understood, however, that the foregoing descriptions of LDVs 100, 700, and 800 are purely exemplary and are not intended to be limiting.

FIG. 9 illustrates a system 900, according to an embodiment of the present invention. In one example, system 900 includes a radiation source 920, a modulator 940, a transceiver 960, an optical mixer 980 and a signal processor 990. These elements may operate similarly to analogous features discussed above. In one example, one or more of modulator 940, transceiver 960, and mixer 980 may include multiple elements, i.e., one or more modulators, one or more transceivers, and one or more mixers, discussed in detail below.

In one example, source 920 is coupled to optical mixers 986-1-1 to **986-*n-m* via respective paths 930-1-1 to 930-*n-m*, transceivers 960-1 to 960-*n* are coupled to optical mixers 980-1 to 980-*n* via respective paths 950-1 to 950-*n*, and optical mixers 980-1 to 980-*n* are coupled to signal processor 990 via respective paths 985-1 to 985-*n***.

In one example, source 920 comprises a coherent radiation source 922, e.g., as a laser. In an example, laser 922 can be a fiber optic laser. In another example, laser 922 can be a rare-earth-doped fiber laser. In another example, laser 922 can be an erbium-doped fiber laser.

In one example, modulator 940 includes one or more modulators 942-1 to **942-*n*, n being a positive integer. In one example, first modulator 942-1 can operate to introduce a temporal amplitude modulation. In an example, the temporal amplitude modulation induced by modulator 942-1** can be of the form of a pulse. In an example, the temporal amplitude modulation can be of the form of a square wave pulse. In an example, the temporal amplitude modulation can be of the form of a sequence of pulses. In an example, the temporal amplitude modulation can be of the form of a sequence of pulses each with fixed duration of a first time duration separated by a second time duration. In an example, the temporal modulation can be of the form of an arbitrary sequence of pulses of arbitrary shape and duration separated by arbitrary delays. In an example, the temporal amplitude modulation can be of the form of a sequence of square wave pulses.

In an example, modulator 942-1 can be a semiconductor optical amplifier (SOA). In another example, modulator 942-1 can operate to induce a frequency modulation so as to shift the frequency of the source radiation to a higher or lower frequency. In an example, modulator 942-1 can be an acousto-optic modulator (AOM).

In an example, modulator 942-2 can operate to introduce a polarization modulation. In an example, the polarization modulation can be a rotation of the linear polarization of the source radiation. In an example, the polarization modulation can be such as to change a linear polarization of the source radiation into elliptical polarization. In an example, the polarization modulation can change an elliptical polarization of the source radiation into a linear polarization. In an example, modulator 942-2 can be a birefringent crystal. In an example, modulator 942-2 can be coupled to a Faraday rotator 946. In an example, modulator 942-2 can be any device known in the art that operates to introduce a polarization modulation to the source radiation.

In one example, the use of first and second modulators 942-1 and 942-2 in series allows for a pulse amplitude modulation, such as a smaller pulse window (shorter duration and amplitude) within a larger pulse.

In an example, modulator 940 may also contain one or more optical isolators 944-m, where only isolator 944-1 is shown in FIG. 9. Optical isolators can be used to ensure that light propagates only in one direction along an optical fiber just as a diode in an electrical circuit ensures that current only flows in one direction.

In an example, transceiver 960 includes one or more transceiver modules 960-1 to 960-n. Each transceiver module 960-1 can include a splitter 964-1, one or more transceivers 966-1-1 to 966-1-m, m being a positive integer, and an optional delay 968-1. Splitter 964-1 can be a 1×m splitter, splitting a beam received from modulator 940 into m beams, one for each transceiver 966-1 to 966-m. Each of the transceivers 966-1-1 to 966-1-m can comprise similar features and function similarly to transceivers 300 as shown in FIG. 4 and described above.

In one example, delays 968-1 to 968-n are used to adjust the relative phases of the radiation input to transceivers 966-1-1 to 966-n-m to account for differing path lengths between the various transceivers and source 920.

In one example, optical mixer 980 includes one or more mixer modules 980-1 to 980-n. For example, corresponding transceiver modules 960-1 to 960-n are coupled via respective paths 950-1 to 950-n to corresponding optical mixers 980-1 to 980-n. In one example, each mixer module 980-1 to 980-n includes an optional delay 982-n along path 930-n coupled to source 920, a splitter 984-n, one or more mixers 986-1-1 to 986-1-m, and optional delays 988-1-1 to 988-1-n coupled along paths 950-n to respective transceivers 966-1-1 to 966-1-m in respective transceiver modules 960-1 to 960-n.

In one example, delays 982-1 to 982-n can be used to adjust the relative phases of the radiation input to mixers 980-1 to 980-n to account for differing path lengths between the source and mixer modules 980-1 to 980-n.

In one example, delays 988-1-1 to 988-n-m can be used to adjust the relative phases of the radiation input to the various mixers 986-1-1 to 986-n-m from the respective transceivers 966-1-1 to 966-n-m to account for differing path lengths between the respective mixers and transceivers.

In one example, splitter 984-1 can split a beam from source 920 into m beams that travel to corresponding mixers 986-1-1 to 986-1-m along respective paths 930-1-1 to 930-1-m. As discussed above, the optical mixers can measure a Doppler shift associated with radiation received by each transceiver 960 or 966 reflected back from the target regions relative to that of the source 920. Thus, the function of the beam splitters 984-n is to provide reference signals from the source 920 to each of the mixers 986 that are needed in order to compare with the reflected radiation signal so as to measure a Doppler shift.

In one example, signals from each of the mixers 980-1 to 980-n are received via paths 985-1 to 985-n at signal processor 990. These signals can be the digitized form of the respective Doppler shifts calculated by the various mixers as described above with reference to FIG. 5. In an example, the signal processor 990 can calculate a velocity component associated with each transceiver 960 or 966.

FIG. 10 illustrates a system 1000, according to an embodiment of the present invention. In one example, system 1000 includes a radiation source 1020, a modulator 1040, a transceiver 1060, an optical mixer 1080 and a signal processor 1090. These elements may operate similarly to analogous features discussed above. In one example, one or more of modulator 1040, transceiver 1060, and mixer 1080 may include multiple elements, i.e., one or more modulators, one or more transceivers, and one or more mixers, discussed in detail below.

In one example, source 1020 is coupled to optical mixers 1086-1-1 to 1086-n-m 1080 via respective paths 1030-1-1 to 1030-n-m, transceivers 1060-1 to 1060-n are coupled to optical mixers 1080-1 to 1080-n via respective paths 1050-1 to 1050-n, and optical mixers 1080-1 to 1080-n are coupled to signal processor 1090 via respective paths 1085-1 to 1085-n.

In one example, source 1020 comprises sources 1022-1 to 1022-m, each of which can be any source of coherent radiation, e.g., as a laser. In an example, each of sources 1022-1 to 1022-m can be a fiber optic laser. In another example, each of sources 1022-1 to 1022-m can be a rare-earth-doped fiber laser. In another example, each of sources 1022-1 to 1022-m can be an erbium-doped fiber laser.

In an example, each of sources 1022-1 to 1022-m can provide radiation at one or more different frequencies. In another example each of sources comprises m distinct frequencies. In an example, source 1020 further comprises a multiplexer (MUX) 1024-1, e.g., a wave length division multiplexer, that combines beams from the various radiation sources into a single optical fiber 1026 that is output from source 1020 as input to a modulator 1040.

In one example, modulator 1040 includes one or more modulators 1042-1 to 1042-n. In one example, first modulator 1042-1 can operate to introduce a temporal amplitude modulation. In an example, the temporal amplitude modulation induced by modulator 1042-1 can be of the form of a pulse. In an example, the temporal amplitude modulation can be of the form of a square wave pulse. In an example, the temporal amplitude modulation can be of the form of a sequence of pulses. In an example, the temporal amplitude modulation can be of the form of a sequence of pulses each with fixed duration of a first time duration separated by a second time duration. In an example, the temporal modulation can be of the form of an arbitrary sequence of pulses of arbitrary shape and duration separated by arbitrary delays. In an example, the temporal amplitude modulation can be of the form of a sequence of square wave pulses.

In an example, modulator 1042-1 can be a semiconductor optical amplifier (SOA). In another example, modulator 1042-1 can operate to induce a frequency modulation so as to shift the frequency of the source radiation to a higher or lower frequency. In an example, modulator 1042-1 can be an acousto-optic modulator (AOM).

In an example, modulator 1042-2 can operate to introduce a polarization modulation. In an example, the polarization modulation can be a rotation of the linear polarization of the source radiation. In an example, the polarization modulation can be such as to change a linear polarization of the source radiation into elliptical polarization. In an example, the polarization modulation can change an elliptical polarization of the source radiation into a linear polarization. In an example, modulator 1042-2 can be a birefringent crystal. In an example, modulator 1042-2 can be coupled to a Faraday rotator 1046. In an example, modulator 1042-2 can be any device known in the art that operates to introduce a polarization modulation to the source radiation.

In one example, the use of first and second modulators 1042-1 and 1042-2 in series allows for a pulse amplitude modulation such as a smaller pulse window (shorter duration and amplitude) within a larger pulse.

In an example, modulator 1040 may also contain one or more optical isolators 1044-m. Optical isolators 1044 can be used to ensure that light propagates only in one direction along an optical fiber, e.g., similar to a diode in an electrical circuit ensures that current only flows in one direction.

In an example, transceiver 1060 includes one or more transceiver modules 1060-1 to 1060-n. Each transceiver module 1060-1 can include a demultiplexer (DEMUX) 1064-1, e.g., a wave length division DEMUX, one or more transceivers 1066-1-1 to 1066-1-*m*, and an optional delay 1068-1. Demultiplexer 1064-1 can split a beam received from modulator 1040 into m beams, each having a separate frequency, one for each transceiver 1066-1 to 1066-*m*. Each of the transceivers 1066-1-1 to 1066-1-*m* can comprise similar features and function similarly to transceivers 300 as shown in FIG. 4 and described above.

In one example, delays 1068-1 to 1068-*n* are used to adjust the relative phases of the radiation input to transceivers 1066-1-1 to 1066-*n-m* to account for differing path lengths between the various transceivers and the source 1020.

In one example, optical mixer 1080 includes one or more mixer modules 1080-1 to 1080-*n*. For example, corresponding transceiver modules 1060-1 to 1060-*n* are coupled via respective paths 1050-1 to 1050-*n* to corresponding optical mixers 1080-1 to 1080-*n*. In one example, each mixer module 1080-1 to 1080-*n* includes an optional delay 1082 coupled to source 1020, a demultiplexer (DEMUX) 1084, e.g., a wave length division DEMUX, one or more mixers 1086, and optional delays 1088 coupled to respective transceivers 1066.

In one example, delays 1082-1 to 1082-*n* can be used to adjust the relative phases of the radiation input to mixer modules 1080-1 to 1080-*n* to account for differing path lengths between the source 1020 and mixer modules 1080-1 to 1080-*n*

In one example, delays 1088-1-1 to 1088-*n-m* can be used to adjust the relative phases of the radiation input to the various mixers 1086-1-1 to 1086-*n-m* from the respective transceivers 1066-1-1 to 1066-*n-m* to account for differing path lengths between the respective mixers and transceivers.

In one example, wave length division demultiplexers 1084-1 to 1084-*n* can split a beam from source 1020 into m beams, each with a different frequency, that travel to corresponding mixers 1086-1-1 to 1086-1-*m*. As discussed above, the optical mixers measure a Doppler shift associated with radiation received by each transceiver reflected back from the target regions relative to the source. Thus, the function of the wavelength division demultiplexers 1084-1 to 1084-*n* can be to provide reference signals from the source 1020 to each of the mixers 1080/1086 that are needed in order to compare with the reflected radiation signal so as to measure a Doppler shift.

In one example, signals from each of the mixers 1080-1 to 1080-*n* are received via path 1085-1 to 1085-*n* at signal processor 1090. These signals can be the digitized form of the respective Doppler shifts calculated by the various mixers as described above with reference to FIG. 5. In an example, the signal processor 1090 can calculate a velocity component associated with each transceiver.

FIG. 11 illustrates a system 1100, according to an embodiment of the present invention. In one example, system 1100 includes a radiation source 1120, a modulator 1140, a transceiver 1160, an optical mixer 1180 and a signal processor 1190. These elements may operate similarly to analogous features discussed above. In one example, one or more of modulator 1140, transceiver 1160, and mixer 1180 may include multiple elements, i.e., one or more modulators, one or more transceivers, and one or more mixers, discussed in detail below.

In one example, source 1120 is coupled to optical mixer 1180 via path 1030, transceiver 1060 is coupled to optical mixer 1180 via path 1150, and optical mixer 1180 is coupled to signal processor 1190 via path 1185.

In one example, source 1120 comprises sources 1122-1 to 1122-*m*, each of which can be any source of coherent radiation, e.g., as a laser. In an example, each of sources 1122-1 to 1122-*m* can be a fiber optic laser. In another example, each of sources 1122-1 to 1122-*m* can be a rare-earth-doped fiber laser. In another example, each of sources 1122-1 to 1122-*m* can be an erbium-doped fiber laser.

In an example, each of sources 1122-1 to 1122-*m* can provide radiation at one or more different frequencies. In another example each of sources comprises m distinct frequencies. In an example, source 1120 further comprises a multiplexer (MUX) 1124, e.g., a wave length division MUX, that combines beams from the various radiation sources 1122 into a single optical fiber 1126 that is output from source 1120 as input to a modulator 1140.

In one example, modulator 1140 includes one or more modulators 1142-1 to 1142-*n*. In one example, first modulator 1142-1 can operate to introduce a temporal amplitude modulation. In an example, the temporal amplitude modulation induced by modulator 1142-1 can be of the form of a pulse. In an example, the temporal amplitude modulation can be of the form of a square wave pulse. In an example, the temporal amplitude modulation can be of the form of a sequence of pulses. In an example, the temporal amplitude modulation can be of the form of a sequence of pulses each with fixed duration of a first time duration separated by a second time duration. In an example, the temporal modulation can be of the form of an arbitrary sequence of pulses of arbitrary shape and duration separated by arbitrary delays. In an example, the temporal amplitude modulation can be of the form of a sequence of square wave pulses.

In an example, modulator 1142-1 can be a semiconductor optical amplifier (SOA). In another example, modulator 1142-1 can operate to induce a frequency modulation so as to shift the frequency of the source radiation to a higher or lower frequency. In an example, modulator 1142-1 can be an acousto-optic modulator (AOM).

In an example, modulator 1142-2 can operate to introduce a polarization modulation. In an example, the polarization modulation can be a rotation of the linear polarization of the source radiation. In an example, the polarization modulation can be such as to change a linear polarization of the source radiation into elliptical polarization. In an example, the polarization modulation can change an elliptical polarization of the source radiation into a linear polarization. In an example, modulator 1142-2 can be a birefringent crystal. In an example, modulator 1142-2 can be coupled to a Faraday rotator 1146. In an example, modulator 1142-2 can be any device known in the art that operates to introduce a polarization modulation to the source radiation.

In an example, modulator 1140 can operate so as to send only a single frequency at a time from the source 1120 to the transceiver 1160.

In one example, the use of first and second modulators 1142-1 and 1142-2 in series allows for a pulse amplitude modulation such as a smaller pulse window (shorter duration and amplitude) within a larger pulse.

In an example, modulator 1140 may also contain one or more optical isolators 1144-*m*. Optical isolators 1144 can be used to ensure that light propagates only in one direction along an optical fiber, just as a diode in an electrical circuit ensures that current only flows in one direction.

In one example, each transceiver module 1160 can include a demultiplexer (DEMUX) 1164, e.g., a wave length division DEMUX, transceivers 1166-1 to 1166-*m*, and an optional delay 1168. Demultiplexer 1164 can split a beam received from modulator 1140 into m beams, each having a separate frequency, one for each transceiver 1166-1 to 1166-*m*. Each of the transceivers 1166-1 to 1166-*m* can comprise similar features and function similarly to transceivers 300 as shown in FIG. 4 and described above.

In one example, delay 1168 is used to adjust the relative phases of the radiation input to transceivers 1166 to account for a differing path length between each transceiver 1160 and the source 1120.

In an example, transceiver module 1160 is coupled via path 1150 to corresponding optical mixer 1180. In one example, mixer module 1180 includes an optional delay 1182 coupled to source 1120, a mixer 1186, and an optional delay 1188 coupled to transceivers 1166-1 to 1166-*m*.

In one example, delay 1182 can be used to adjust the relative phase of the radiation input to mixer 1180 to account for path length differences between the source and mixer module 1180 relative to the path length between the source and transceiver module 1160.

In one example, delay 1188 can be used to adjust the relative phase of the radiation input to the mixer 1186 from the transceiver 1166 to account for path length differences between the respective mixers and transceivers 1166 relative to the path length between the source and mixer module 1180.

As discussed above, the optical mixer 1180 can measure a Doppler shift associated with radiation received by the transceiver 1160 reflected back from the target regions relative to a reference signal from the source 1120 via path 1130 input to the mixer 1180.

In one example, the signal output from the mixer 1180 is received via path 1185 at signal processor 1190. This signal can be a digitized form of the respective Doppler shifts calculated by the various mixers as described above with reference to FIG. 5. In an example, the signal processor can calculate a velocity component associated with each transceiver.

As an exemplary application, the disclosed laser velocimeter systems may be used to determine the velocity of wind approaching a wind turbine so that the wind turbine can be dynamically controlled to more efficiently produce renewable energy. In such an application, it would be advantageous and feasible with the disclosed systems to measure wind velocities at a plurality of target regions at different ranges either simultaneously or at successive time intervals.

While specific embodiments of the present invention have been described above, it will be appreciated that the present invention may be practiced otherwise than as described. The description is not intended to limit the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A velocimeter comprising:
   a radiation source configured to produce a coherent radiation beam;
   a modulating system comprising:
      a plurality of modulators, wherein each of the plurality of modulators is configured to modulate the coherent radiation beam; and
      a plurality of optical isolators, wherein each of the plurality of isolators is configured to provide unidirectional propagation of light in an optical fiber;
   a plurality of transceiver modules comprising a plurality of transceivers, wherein each of the plurality of transceivers is configured to:
      receive the modulated beam from the source;
      transmit the modulated beam to a target region; and
      receive a reflected signal from the target region;
   a plurality of optical mixing systems, wherein each of the plurality of optical mixing systems comprises:
      a plurality of optical mixers coupled to the plurality of transceivers, wherein each of the plurality of optical mixers is configured to:
         receive a reference signal from the source and the reflected signal from the corresponding transceiver; and
         determine a Doppler shift based on the reference signal from the source and the reflected signal from the corresponding transceiver.

2. The velocimeter of claim 1, wherein the radiation source is further configured to produce a single-frequency coherent radiation beam.

3. The velocimeter of claim 1, wherein the radiation source is located within a source module.

4. The velocimeter of claim 3, wherein the source module comprises an amplifier configured to amplify the coherent radiation beam.

5. The velocimeter of claim 1, wherein a first one of the plurality of modulators is configured to provide frequency modulation and temporal amplitude modulation to the radiation beam.

6. The velocimeter of claim 1, wherein a first one of the plurality of modulators is configured to provide polarization modulation to the radiation beam.

7. The velocimeter of claim 1, wherein a first one of the plurality of modulators is a semiconductor optical amplifier.

8. The velocimeter of claim 1, wherein a first one of the plurality of modulators is an acousto-optic modulator.

9. The velocimeter of claim 1, wherein a first one of the plurality of modulators is a birefringent crystal modulator.

10. The velocimeter of claim 1, wherein first and second ones of the plurality of modulators are configured to provide sequential modulation to the radiation beam to produce a pulse amplitude modulated radiation beam.

11. The velocimeter of claim 1, wherein there are m transceivers in the plurality of transceivers, m being a positive number greater than 1, and the velocimeter further comprises a first 1×m splitter configured to split the modulated radiation beam into m beams and to transmit each of the m beams into corresponding ones of the plurality of transceivers.

12. The velocimeter of claim 1, wherein each of the plurality of transceiver modules further comprises a first delay configured to adjust relative phases of the modulated radiation beams transmitted to the plurality of the transceivers.

13. The velocimeter of claim 1, wherein there are m optical mixes in the plurality of optical mixers, m being a positive number greater than 1, and the velocimeter further comprises a 1×m splitter configured to split the reference signal into m signals and to input each of the m signals into corresponding ones of the plurality of optical mixers.

14. The velocimeter of claim 1, wherein each of the plurality of optical mixing systems comprises a delay configured to adjust relative phase of the reference signal transmitted to the optical mixing system.

15. The velocimeter of claim 1, further comprising a plurality of delays located between the plurality of optical mixers and the plurality of transceivers, each of the plurality of delays being configured to adjust relative phases of the reflected signals received from a respective one of the plurality of the transceivers.

16. A velocimeter comprising:
a plurality of laser sources configured to produce coherent radiation beams comprising a plurality of different frequencies;
a modulating system comprising:
a modulator configured to modulate respective ones of the coherent radiation beams; and
an optical isolator configured to provide unidirectional propagation of light in an optical fiber;
a transceiver module comprising a plurality of transceivers, wherein each of the plurality of transceivers is configured to:
receive respective ones of the modulated beams from the source;
transmit the respective ones of the modulated beams to a target region; and
receive a reflected signal from the target region;
an optical mixing system comprising:
a plurality of optical mixers coupled to the plurality of transceivers, wherein each of the plurality of optical mixers is configured to:
receive respective reference signals from the source and the reflected signal from the corresponding transceiver; and
determine a Doppler shift based on the respective reference signal from the source and the reflected signal from the corresponding transceiver.

17. The velocimeter of claim 16, further comprising a multiplexer configured to receive the coherent radiation beams and to produce a single radiation beam as an input signal to the modulating system.

18. The velocimeter of claim 16, wherein there are m transceivers in the plurality of transceivers, m being a positive number greater than 1, and the velocimeter further comprises a first 1×m demultiplexer configured to split the modulated radiation beam into m beams comprising m different frequencies and to input each of the m beams into corresponding ones of the plurality of transceivers.

19. The velocimeter of claim 16, wherein there are m optical mixers, m being a positive number greater than 1, and the velocimeter further comprises a 1×m demultiplexer configured to split the reference signal into m signals comprising m different frequencies and to input each of the m signals into corresponding ones of the plurality of optical mixers.

20. The velocimeter of claim 16, wherein the modulating system is further configured to transmit one frequency at a time from the plurality of sources to the plurality of transceivers.

21. The velocimeter of claim 16, wherein a modulator is configured to provide frequency modulation and temporal amplitude modulation to the radiation beam.

22. The velocimeter of claim 16, wherein a modulator is configured to provide polarization modulation to the radiation beam.

23. The velocimeter of claim 16, wherein a modulator is a semiconductor optical amplifier.

24. The velocimeter of claim 16, wherein a modulator is an acousto-optic modulator.

25. The velocimeter of claim 16, wherein a modulator is a birefringent crystal modulator.

26. The velocimeter of claim 16, further comprises another modulator, wherein the modulator and the another modulator are configured to provide sequential modulation to the radiation beam to produce a pulse amplitude modulated radiation beam.

* * * * *